(No Model.) O. C. PUDAN. 5 Sheets—Sheet 2.
FLUID METER.

No. 461,799. Patented Oct. 20, 1891.

(No Model.) O. C. PUDAN. 5 Sheets—Sheet 4.
FLUID METER.

No. 461,799. Patented Oct. 20, 1891.

(No Model.)

O. C. PUDAN.
FLUID METER.

No. 461,799.

5 Sheets—Sheet 5.

Patented Oct. 20, 1891.

Witnesses:
J. N. Cooke
Robt. D. Totten

Inventor
Oliver C. Pudan
By James F. Kay
Attorney

UNITED STATES PATENT OFFICE.

OLIVER C. PUDAN, OF PITTSBURG, PENNSYLVANIA.

FLUID-METER.

SPECIFICATION forming part of Letters Patent No. 461,799, dated October 20, 1891.

Application filed December 9, 1890. Serial No. 374,094. (No model.)

*To all whom it may concern:*

Be it known that I, OLIVER C. PUDAN, a resident of Pittsburg, in the county of Allegheny and State of Pennsylvania, have invented a new and useful Improvement in Fluid-Meters; and I do hereby declare the following to be a full, clear, and exact description thereof.

My invention relates to fluid-meters for measuring gas, steam, or liquids, my invention being an improvement upon the reciprocating piston-meter described in application for patent filed by me June 2, 1890, Serial No. 353,983, the object of the present invention being to simplify the feeding and discharge passages leading to the measuring cylinders or chambers, and the valve mechanism for controlling the same; to improve the arrangement of the meter so as to obtain compactness therein, and to provide for the reduction of the space containing the sealing-fluid, as will be hereinafter specifically described and claimed.

To enable others skilled in the art to make and use my invention, I will describe the same more fully, referring to the accompanying drawings, in which—

Figure 1:
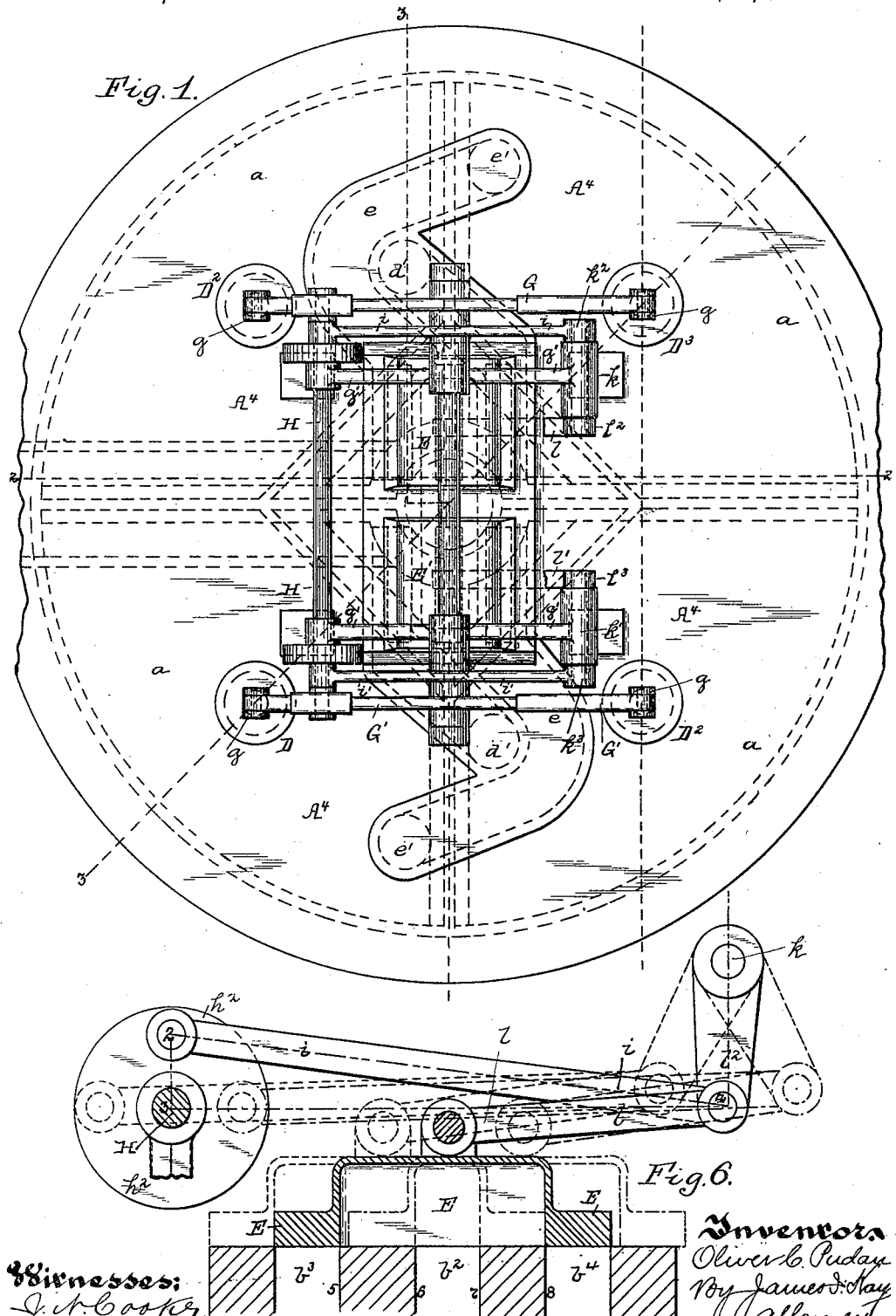
Figure 2:
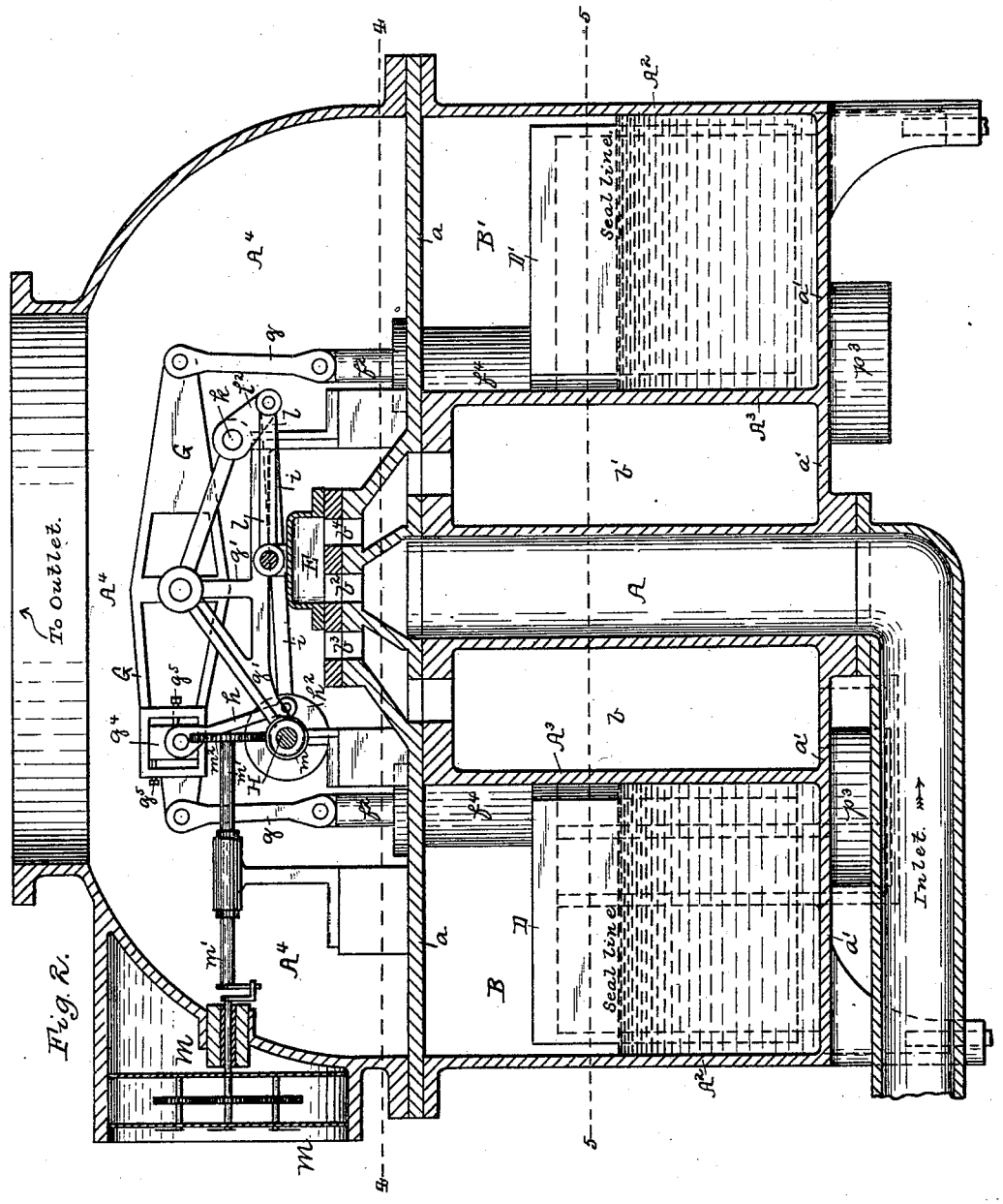
Figure 3:
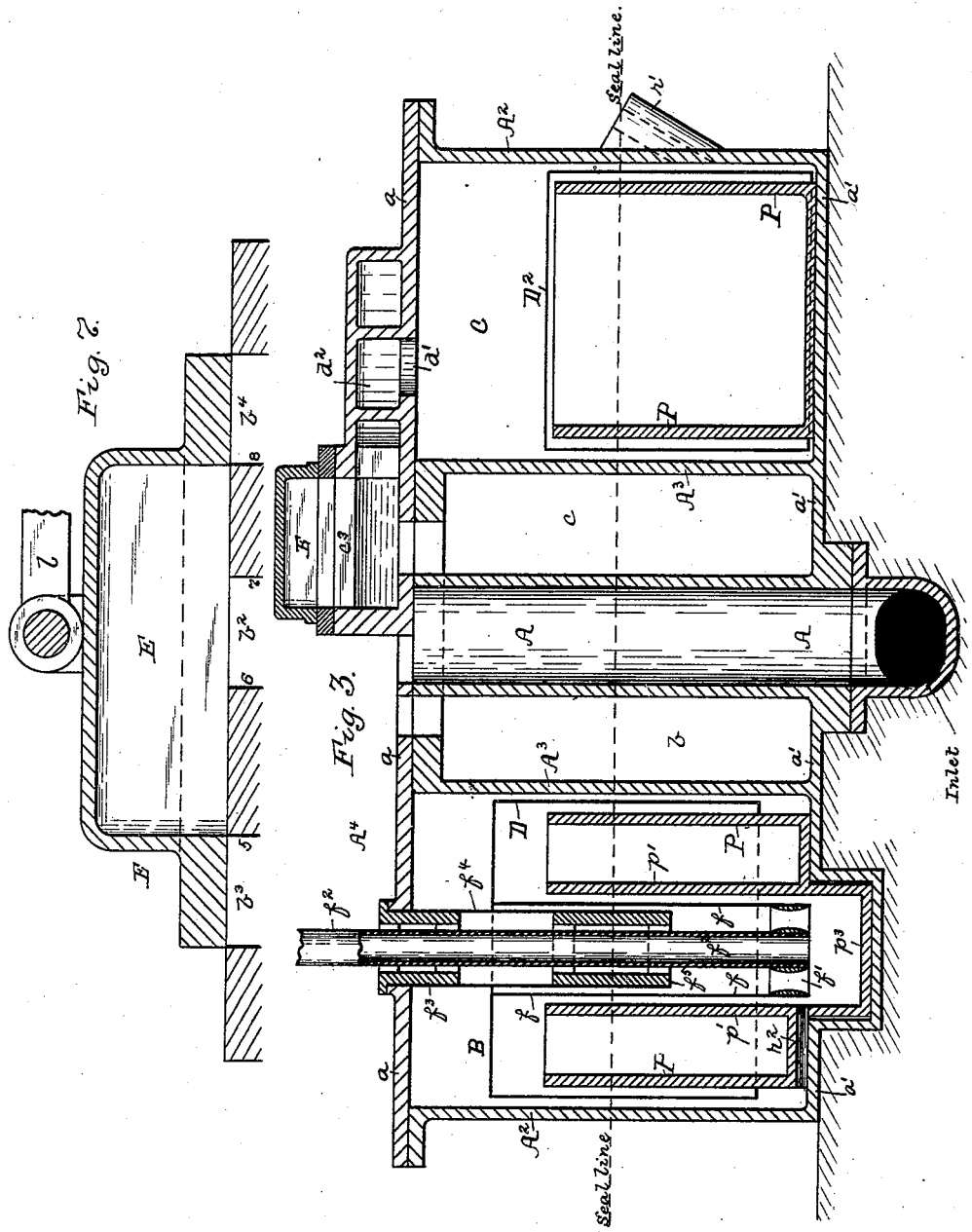
Figure 4:
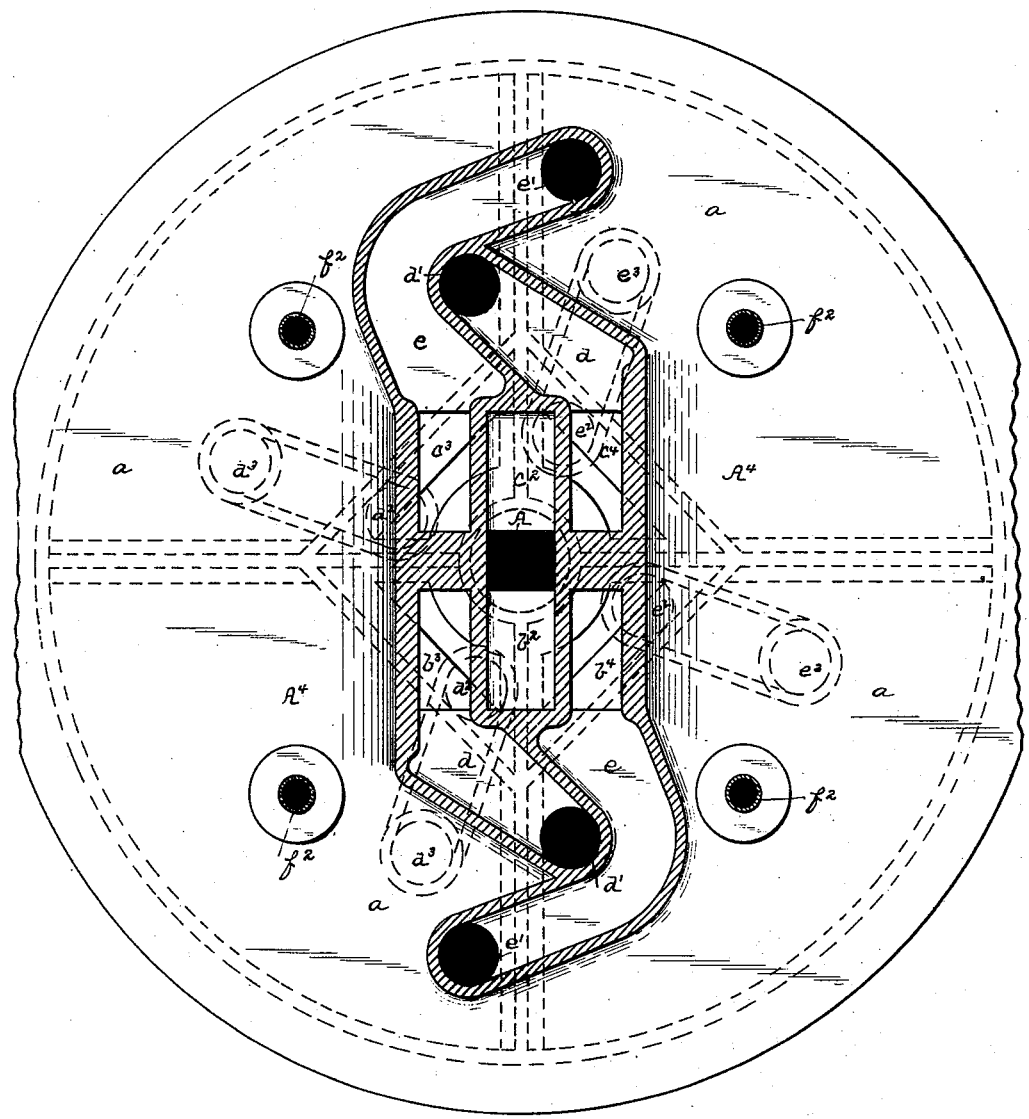
Figure 5:
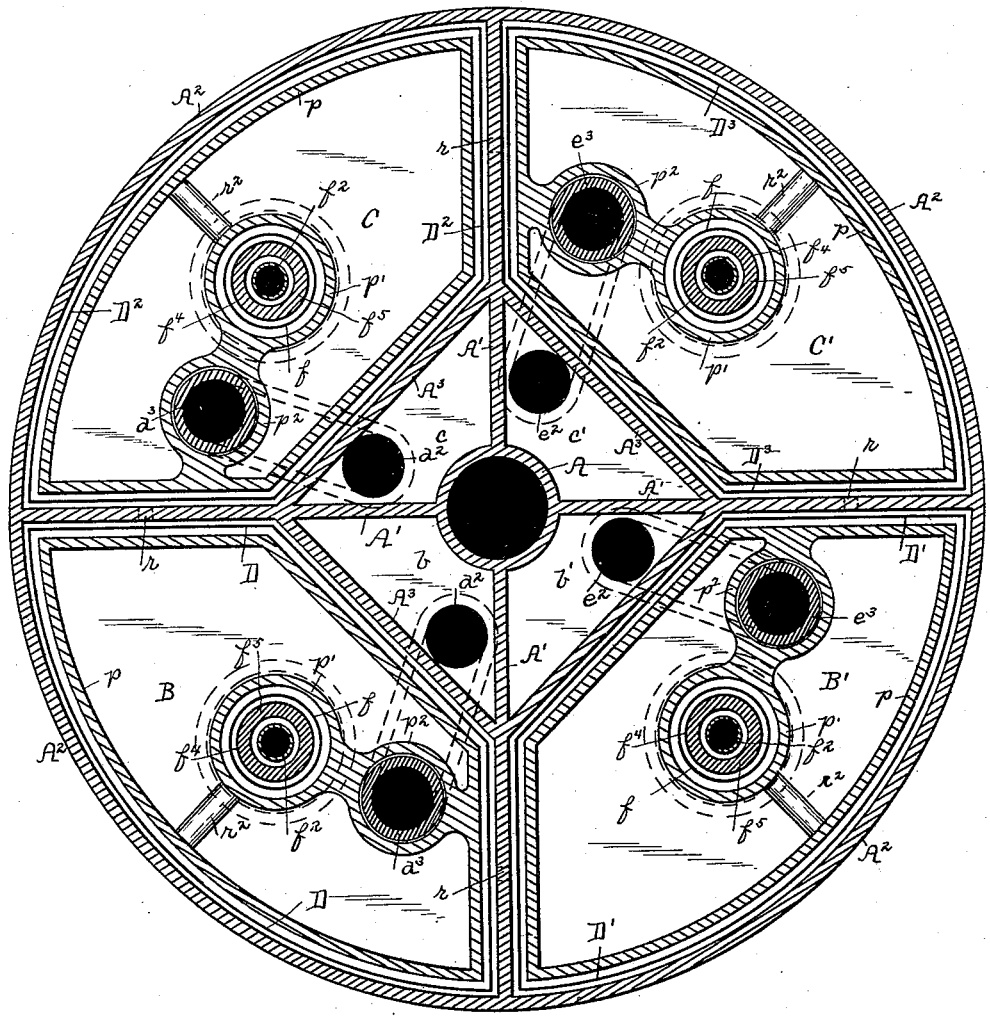

Figure 1 is a top view of the meter embodying my invention. Fig. 2 is a vertical section on the line 2 2, Fig. 1. Fig. 3 is a vertical section on the line 3 3, Fig. 1. Fig. 4 is a horizontal section on the line 4 4, Fig. 2. Fig. 5 is a horizontal section on the line 5 5, Fig. 2. Figs. 6 and 7 are detailed views of the valve and its ports.

Like letters of reference indicate like parts in each.

The meter is cylindrical in cross-section, and as indicated in dotted lines in Figs. 1 and 4, and shown more clearly in Fig. 5, the supply-passage A enters centrally with the meter, and extending out therefrom are the radial walls A', which extend to the outer cylindrical wall $A^2$. Connecting these radial walls are walls $A^3$, which form the four chambers $b$ $b'$ $c$ $c'$ around the supply-passage A, and beyond the same the four chambers or "cylinders," as they might be called, B B' C C'. These cylinders having the outer curved wall formed by the outer cylindrical wall $A^2$, the radial walls A' extending in therefrom and the straight wall $A^3$, and having also the top walls or cylinder-heads $a$, and the bottom walls or cylinder heads $a'$. The bottom wall $a'$ may be cast with the main body of the meter, but the top wall $a$ is formed separate, and secured thereto by means of a flange extending around the meter. It is thus seen that by such construction of the meter I am enabled to form it cylindrical in cross-section and arrange the measuring chambers or cylinders and the feeding and discharge passages $b$ $b'$ $c$ $c'$ between such cylinders and the supply-passage A, so obtaining a compact meter in which all the space is utilized either for the supply-passage, the feeding and discharge passages, or the measuring-cylinders. Extending over the central feeding-passage A and the feeding and discharge passages are the valve-ports, there being one set of valve-ports—such as the supply-port $b^2$ and the feeding and discharge ports $b^3$ $b^4$—communicating with the central supply-passage A and with the feeding and discharge passages $b$ $b'$, leading to the cylinders B B', and a like set of passages $c^2$ $c^3$ $c^4$, communicating with the central supply-passage A and the feeding and discharge passages $c$ $c'$, leading to the measuring-cylinders C C'. Extending out from the passage $b$ is the passage $d$, which leads over the top of the measuring-cylinders and opens into the upper end of the measuring-cylinder B', as at $d'$, and leading out from the lower end of said passage $b$ is a passage $d^2$, extending under the cylinder B, and opening into the cylinder B by means of a vertical pipe $d^3$, which rises within said measuring-cylinder above the sealing-fluid and opens within the inverted-cup piston D within said cylinder B, so providing for the feeding of gas from said passage $b$ to the upper end of the measuring-cylinder B' and to the lower end of the cylinder B. The several ports leading from the feeding and discharge passage $b'$ are arranged in the same way and lead into different measuring-cylinders, the passage $e$ leading from the passage $b'$ into the upper end of the cylinder B, as at $e'$, and the passage $e^2$ leading from the lower end of said passage $b'$ to the rising pipe $e^3$ within the cylinder B'. The arrangement for the other two measuring-cylinders C C' is the same as that above described, and I have marked the different passages leading from the passages $c$ $c'$ with the same letters—viz, the pasters $d\ d'\ d^2\ d^3$ and passages leading from the passage $c'$ with the letters $e\ e'\ e^2\ e^3$. The several inverted-cup pistons in the several chambers are marked, respectively, $D\ D'\ D^2\ D^3$. The ports $b^2\ b^3\ b^4$ are controlled by one slide-valve E, while the ports $c^2\ c^3\ c^4$ are controlled by one slide-valve E', these valves being operated in the manner hereinafter described. The ports when uncovered by said valves open directly into the measured-gas chamber $A^4$ in the upper part of the meter, so that the gas which has been measured can flow from such ports directly into the said chamber, and thence to the point of consumption. It will thus be seen that by carrying two passages from each supply and discharge passage, the one above one cylinder and the other under the other cylinder, I am enabled to reduce the number of valve-ports one-half, as each valve-port receives the gas to be fed to the top of one cylinder and to the lower end of the other cylinder, and therefore two separate valve-ports for each measuring-cylinder are not required.

As described in the application filed by me, as above referred to, the inverted-cup pistons are provided with central tubes $f$, open at both ends, which extend down to or below the lower end of the cup-piston, each such tube being connected at its lower end by a skeleton fitting $f'$ to the piston-rod $f^2$, which, as shown, is formed of a hollow tube, open at the lower end, and communicates at the upper end with the measured-gas space $A^4$, and which extends through the top of the measuring-cylinder, through a loose guiding-ring $f^3$ into the measured-gas chamber $A^4$. Depending from said ring $f^3$ is a tube $f^4$, which extends down below the fluid-seal line within the tube $f$ of the inverted-cup piston, and so forms a seal between the tube of such piston and the passage through which the piston runs, said tube $f^4$ having preferably a guiding-ring $f^5$ at the lower end thereof. By such construction all friction between the inverted-cup piston and the measuring-cylinder is prevented, while the connection between the piston and its operating piston-rod is properly sealed, so that the gas may be measured below said piston and above the same, as desired.

The piston-rods of the pistons are connected to working beams within the measured-gas chamber $A^4$, the piston-rods of the measuring-pistons $D\ D'$ being connected to the working beam G, while the piston-rods of the pistons $D^2\ D^3$ are connected to the working beam G', the several pistons being connected with their working beams by means of pitmen $g$, and the working beams being mounted in suitable frames $g'$, secured to the top plate $a$. Each beam G G' has a strap or pitman $h\ h'$, respectively, extending down to and connected to cranks or crank-disks $h^2\ h^3$, respectively, on the shaft H, mounted in said frames $g'$, and extending from cranks on the said shaft H are the straps $i\ i'$, respectively, which extend over to crank-shafts $k\ k'$, respectively, mounted in said frame $g'$, communicating with the crank-arms $k^2\ k^3$, respectively, of said crank-shafts, while extending from other cranks $l^2\ l^3$, respectively, of said crank-shafts to the valves E E' are the straps $l\ l'$, which serve to operate the said valves, imparting thereto a reciprocating motion over to the valve-seats. The pitmen $h$ and $h'$ connect with the crank-shaft H at an angle of ninety degrees to each other, so that when the one pitman is at a dead-point it will be carried past the same by the other pitman, the two measuring-cup pistons in the measuring-cylinders B B' being arranged so as to reach their top and bottom positions, respectively, when the measuring-cup pistons $D^2\ D^3$ in the cylinder C C' are at a mid-point in said cylinders. By this construction the gas entering the meter can pass into the two cylinders connected to the working beam G and by pressure above and below the pistons in the cylinders B B' impart same to such working beam, which will, through the pitman $h$ thereof, turn the shaft H, and so move the valve E' controlling the ports leading to the other measuring-cylinders C C', so as to reverse the same, when the gas entering through said valve E' into the cylinders C C' will operate the working beam G' thereof, and through it the shaft H to reverse the valve E, controlling the ports leading to said measuring-cylinders B B', so providing for the regular movement of the pistons within their cylinders and employing the pressure of the gas within two such cylinders to operate the valve mechanism of the other two cylinders.

It will be seen that the slide-valve E is operated by a rocker-arm $l$ from a rocking crank-shaft $k$, and that this crank-shaft is operated by a rotating crank-shaft H through a strap $i$. It will also be seen that when the crank-arm of the shaft H is at its highest or lowest positions the distance from that crank-arm to the central vertical line of the crank K is that of the hypotenuse of the triangle formed, say, of the lines 2 3 4, Fig. 6. As the distance from 2 to 4 is greater than the length of the strap, it is therefore evident that the valve will not move with the same stroke over the valve face as the ordinary reciprocating-valve. To remedy this difficulty I have formed the valve-ports and their separating-walls, as shown in Fig. 6, the wall between the central and one side port being of greater width than the wall between the central and the other side port. For example, the wall 5 6 between the ports $b^2$ and $b^3$ is of greater width than the wall 7 8 between the ports $b^2$ and $b^4$, the variation in the walls being made according to the difference between the length of the strap $i$ and the hypotenuse of the triangle above described. This throws the one port, such as $b^2$, farther to one side of the natural movement of the valve, and the opening of the valve E is made correspondingly greater. As a result of this construction, the valve will properly register with the ports at the center of its stroke, and with the faces between the ports on one end of its stroke, and at the other end of its stroke will be carried over the wider face or wall 5 6 and properly register with the edge of the central supply-port, so that a perfect working of the valve is obtained notwithstanding the irregular movement imparted from the crank-shaft.

In order to regulate the stroke of the pistons, I secure the pitmen $h$ and $h'$ to their working beams by the longitudinally-adjustable boxes $g^4$, moving in guideways in the beams, adjusting-screws $g^5$ passing through the boxes and their guideways, as shown. The movement of these pitmen is of course controlled by the crank-shaft H, and therefore the stroke of the working beams will be varied according as the boxes $g^4$ are adjusted toward or from the end of the beam, and the length of stroke of the cup-pistons will be accordingly regulated.

In order to register the amount of gas measured, I employ upon the shaft H a worm $m$, which meshes with a worm-wheel $m^2$ upon a shaft $m'$, said shaft communicating with the ordinary measuring-dial mechanism, as shown at M.

In order to obviate the necessity of having a large body of sealing-fluid, which is objectionable, as it is liable to movement under the pressure of the gas, I employ in each one of the measuring-cylinders what are termed "filler-casings," these casings P generally being castings corresponding in shape to the measuring-cylinders, but of smaller diameter than the same, and leaving a free space for the movement of the inverted-cup pistons between the filler-casings and the walls of the measuring-cylinders for the reception of the sealing-fluid, the shape of such filler-casings being clearly shown in Fig. 5. The casings extend up within the cylinders above the sealing-fluid, and are open at their upper ends so as to be filled with the gas, and they are each provided with a tube or cylinder $p'$, corresponding in shape to the tube $f$ of the inverted-cup piston, but somewhat larger in diameter, and with a tube $p^2$ fitting around the pipe $d^3$ or the pipe $e^3$, as the case may be, leading upwardly from the base of the measuring-cylinder to feed the gas from the lower end of said measuring-cylinder under the cup-piston. The filler-casings are cast to shape and rest within the measuring-cylinders, as shown, their outer walls $p$ corresponding in shape thereto, as above stated. As it is desirable that the tube $f$ shall extend below the cup-piston, as more clearly shown in Fig. 3, in order to escape the base of the fitting $f^5$ on the tube $f^4$, I provide the lower wall of each measuring-cylinder with an extension $a^2$ and provide each filler-casing with a like extension $p^3$, fitting within the extension $a^2$, into which extension $p^3$ the lower end of the tube $f$ and the piston-rod $f^2$ may enter, as shown.

The several measuring-cylinders communicate with each other at the base, as shown at $r$, so that the sealing-fluid may be fed into one of said chambers through the seal-entrance $r'$ and may pass therefrom into all the measuring-cylinders, and in order to feed said sealing-fluid into the chambers formed by the cylindrical tubes $p'$ of the filler-casings within which the tubes $f$ reciprocate, I formed at the base of each filler-casing a passage $r^2$ from the outer surrounding space between the wall of the measuring-cylinder and the outer wall $p$ of the filler-casing, so providing for the free circulation of the sealing-fluid throughout all the measuring-cylinders and the central passages thereof.

The operation of my improved meter is as follows: The gas enters the meter through the supply-passage A and rises within the same to the central valve-ports $b^2 c^2$. Supposing that the port $b^3$ communicates through the valve E with the said supply-passage, while the port $b^3$, communicating with the measured-gas space $A^4$, and that the ports $c^3$ $c^4$ are closed by their valve E, the gas will pass through the port $b^2$ into the feeding and discharge passage $b$, and part of it will pass through the passage $d$ and port $d'$ into the upper end of the measuring-cylinder B', while part of it will pass down through said passage $b$ and through the passage $d^2$, and upwardly through the pipe $d^3$, and the gas entering under the inverted-cup piston D and above the inverted-cup piston D' will cause the movement of said pistons, the gas which has previously entered said measuring-cylinders passing from above the piston D through the port $e'$ and passage $e$ into the passage $b'$ and through the pipe $e^3$ and passage $e^2$ into said passage $b'$ and escaping into the measured-gas chamber $A^4$ through the port $b^4$. The pressure of the gas will cause the movement of the working beam G, which, through its pitman $h$, will turn the shaft H, recording the measurement of the gas through the worm $m$ and worm-wheel $m'$, and at the same time, through the strap $i'$, will move the crank-shaft $k'$, and through the strap $l'$ will move the valve E', so opening the port $c^2$ leading to the other measuring-cylinders, and causing the gas to enter the same, so that when the pistons D D' and the working beam G' reach the mid-point of their stroke, the working beam G' and the pistons $D^2 D^3$ will be drawn to their highest and lowest positions, respectively, and the gas will pass through the valve-port $c^2$ to the upper and lower ends, respectively, of the cylinders C C', causing the movement of the pistons in said cylinders, and discharging the gas from above and below the same through the passage $c'$ and port $c^4$ into the measured-gas space $A^4$, and by the movement of the pistons through the working beam G', shaft H, and the connections above described, will draw the pitman $g$ and the pistons connected thereto to their highest and lowest positions, respectively, and move the valve E, so that the gas will enter the feeding and discharge passage $b'$ and pass under the piston D' and above the piston D and the measured gas will be discharged through the passage $b$ into the measured-gas space $A^4$. This movement again through the mechanism above described reversing the position of the measuring-cylinders C C', and the movement being continued as the gas passes through the meter. When the gas first enters the meter a portion thereof will fill the filler-casings P, above referred to, and in the subsequent movement of the meter the gas will remain within such filler-casings, so that a proper measurement of the gas fed them and withdrawn from the said measuring-cylinders will be obtained. As the gas in such filler-casings has no escape from the same, there is no liability of its rising and falling within the casings under the pressure, so that it does not affect the measuring of the gas within the meter. At the same time, as there is but a small surface of the measuring-fluid exposed to the pressure of gas—namely, between the outer walls of the measuring-cylinders and the walls of the filler-casing—and within the tubes $p'$ of the filler-casing, there is no liability of the measurement of the gas being affected by the friction or by the movement of the sealing-fluid. As described in the said application previously made by me, a perfect sealing is obtained for the piston-rods and their connections with the measuring-cylinders while the friction thereof is entirely overcome, and as the space within the depending tubes $f^4$ and within the piston-rods communicates with the measured-gas chamber there is no liability of the compression of the gas within the same in the movement of the piston-rods, a practically free movement for all parts being so obtained. By the reduction of the number of valve-ports for the feeding of the gas to and from the several measuring-cylinders, friction of the only parts requiring a close or metal joint is also reduced to a minimum, while the valve mechanism is greatly simplified.

What I claim as my invention, and desire to secure by Letters Patent, is—

1. A meter having the two measuring-cylinders B B', central supply-passage A, the feeding and discharge passages $b\ b'$, the passage $b$ having the passage $d$ extending over the top of the cylinder B and opening into the upper end of the cylinder B', and the passage $d^2$ leading from its base and opening into the lower end of the cylinder B, and the passage $b'$ having the angular passage $e$ extending over the top of the cylinder B' and opening into the upper end of the cylinder B, and the passage $e^2$, leading from its base and opening into the lower end of the cylinder B', substantially as and for the purposes set forth.

2. In meters, the combination of the meter-body having the measuring-cylinders and feeding and discharge passages, the pistons in the cylinders, the working beam connected thereto, the crank-shaft H, the pitman $h$, connecting the working beam and crank-shaft, strap $i$, crank-shaft $k$, arm $l$, and valve E, controlling the ports of the feeding and discharge passages, substantially as and for the purposes set forth.

3. In meters, the combination of a crank-shaft, a slide-valve and connections between the crank and valve, and a valve-seat having the face between the central port and one side port of greater width than the face between the central port and the other side port, substantially as and for the purposes set forth.

4. A meter having a cylindrical outer wall, a central supply-passage, radial walls extending from the supply-passage to the outer walls, and cross-walls connecting such radial walls, so forming triangular passages around the central passage, and measuring cylinders or chambers between the same and the outer walls, substantially as and for the purposes set forth.

5. In meters, the combination of a measuring-cylinder, a filler casing or tank fitting therein and corresponding in shape to but smaller than the cylinder and open at its upper end, said filler-casing having a central tube, and an inverted-cup piston entering the space between the filler-casing and cylinder and having a central tube entering the chamber formed by the central tube of the filler-casing, substantially as and for the purposes set forth.

6. In meters, the combination of a measuring-cylinder, a filler casing or tank fitting therein and corresponding in shape to but smaller than the cylinder and open at its upper end, said filler-casing having a central tube, and an inverted-cup piston entering the space between the filler-casing and cylinder and having a central tube entering the chamber formed by the central tube of the filler-casing, and said filler-casing having a passage forming communication between the space between the casing and cylinder and the chamber formed by the central tube of the casing, substantially as and for the purposes set forth.

7. In meters, the combination of a working beam, pitmen connecting it to the measuring-pistons, a crank-shaft, and a pitman connected to the crank-shaft and connected to the working beam by a longitudinally-adjustable box, substantially as and for the purposes set forth.

In testimony whereof I, the said OLIVER C. PUDAN, have hereunto set my hand.

OLIVER C. PUDAN.

Witnesses:
JAMES I. KAY,
J. N. COOKE.